Figure 1:
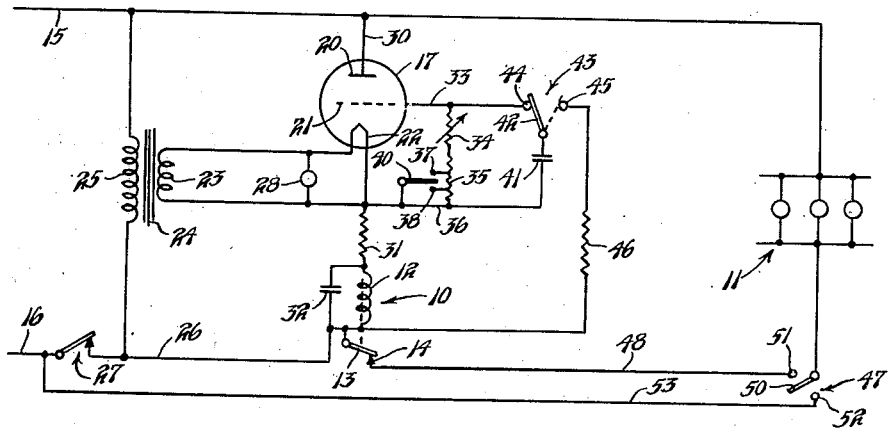

April 4, 1944.    A. B. NEWTON    2,346,079
ELECTRICAL TIMING APPARATUS
Filed Sept. 17, 1942    2 Sheets-Sheet 1

Inventor
ALWIN B. NEWTON
By George N. Fisher
Attorney

April 4, 1944.                A. B. NEWTON                2,346,079
                      ELECTRICAL TIMING APPARATUS
                      Filed Sept. 17, 1942        2 Sheets-Sheet 2
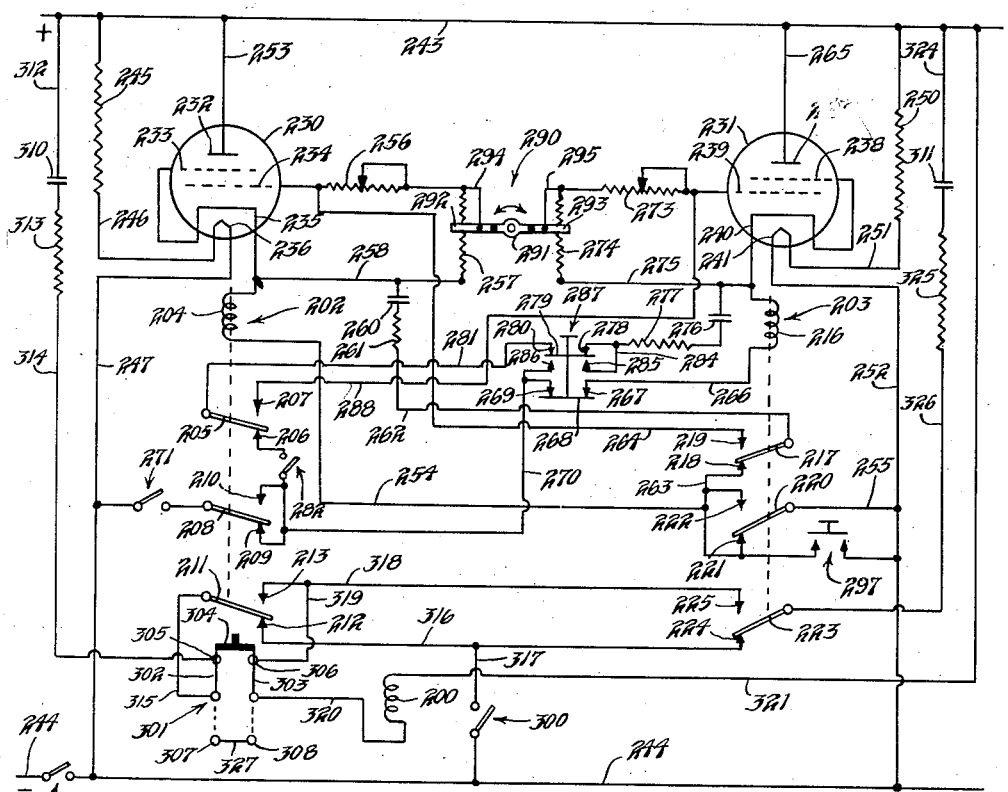
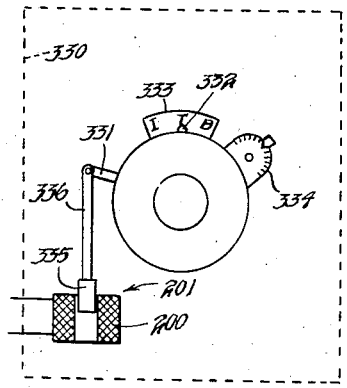
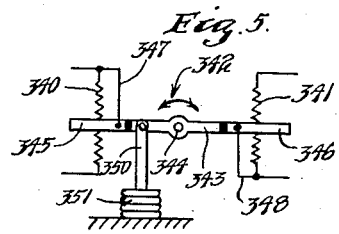
Inventor
ALWIN B. NEWTON
By
George N. Fisher
Attorney Patented Apr. 4, 1944

2,346,079

UNITED STATES PATENT OFFICE 2,346,079

ELECTRICAL TIMING APPARATUS

Alwin B. Newton, Minneapolis, Minn., assignor to Minneapolis-Honeywell Regulator Company, Minneapolis, Minn., a corporation of Delaware Application September 17, 1942, Serial No. 458,699

26 Claims. (Cl. 161—26)

This invention relates to electrical timing apparatus, and particularly to that type of timing apparatus wherein a load device is operated for a predetermined time dependent upon the time required for an electrical condenser to charge or discharge.

An object of the present invention is to provide improved electrical timing apparatus responsive to the state of charge of a condenser.

Another object of the present invention is to provide electrical timing apparatus for controlling a plurality of load devices in such a manner that the load devices are sequentially operated, each for an independently predetermined time. A further object is to provide such a system in which the sequential operation of the load devices may be cyclically repeated.

Another object of the present invention is to provide improved electrical timing apparatus for cyclically energizing and deenergizing a load device. A further object is to provide, in such apparatus, means whereby the relative lengths of the periods of energization and deenergization may be varied. A still further object is to provide, in such apparatus, means whereby the length of a complete cycle of energization and deenergization may be varied, while maintaining the same proportion between the lengths of the periods of energization and deenergization.

Another object of the present invention is to provide improved electrical timing apparatus for a camera shutter.

A further object is to provide, in such apparatus, means whereby the shutter may be timed selectively either for a single exposure or for a plurality of cyclically repeated exposures. A further object is to provide a system adapted to time the exposures of a camera which is selectively adjustable to make exposures of any of the types conventionally referred to as "instantaneous," "time," and "bulb." A further object is to provide timing apparatus which is applicable to time any one of these types of exposures, either for a single exposure or for cyclically repeated exposures.

Another object of the present invention is to provide improved timing apparatus for the shutter of a camera adapted to take stereoscopic aerial survey pictures.

Another object of the present invention is to provide improved timing apparatus for an aerial survey camera including altitude compensating means for insuring constant overlap of successive pictures, regardless of the changes in altitude of the aircraft carrying the camera.

Figure 2:
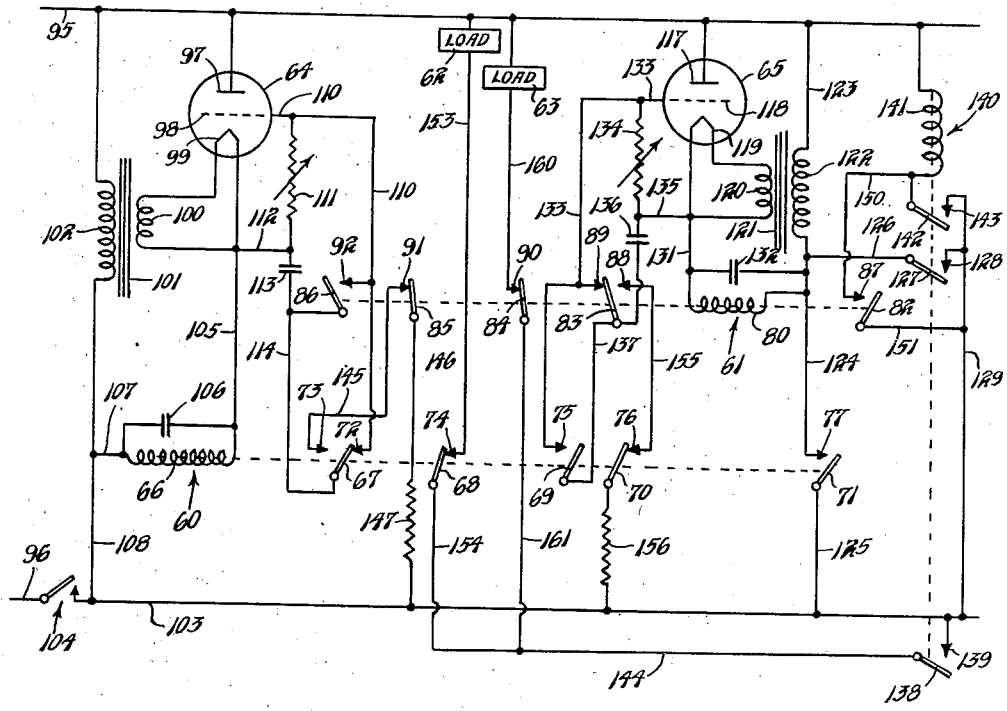

Other objects and advantages of the present invention will become apparent from the consideration of the accompanying specification, claims, and drawings, in which Figure 1 represents a simple electrical timing circuit embodying certain features of my invention, Figure 2 is an electrical circuit diagram of timing apparatus including two circuits of the type shown in Figure 1, whereby a pair of load devices may be sequentially operated, Figure 3 is an electrical circuit diagram of timing apparatus built in accordance with my invention and especially adapted for the control of a camera shutter, Figure 4 is a somewhat diagrammatic illustration of a camera shutter controlling device which may be operated by the system of Figure 3, Figure 5 is an electrical circuit diagram illustrating a modification which may be applied to the circuit shown in Figure 3.

FIGURE 1

Referring now to Figure 1, there is shown a system for timing the operation of a relay, generally indicated at 10, which controls the energization of a load 11, indicated as a plurality of electrical lamps. The relay 10 comprises a winding 12 which controls the movement of a switch arm 13 into and out of engagement with a back contact 14.

The winding 12 and the load 11 are energized from a pair of supply lines 15 and 16, which may be connected to any suitable source of alternating electrical energy. Energization of relay winding 12 from the supply lines is controlled by an electrical discharge device 17, which may be a gas filled tube of the type generally referred to as 2A4G. The discharge device 17 includes an anode 20, a control electrode 21, and a cathode 22. The cathode 22 may be heated from any suitable source of electrical energy. It is shown, by way of example, as being heated from the secondary winding 23 of a transformer 24 having a primary winding 25. The primary winding 25 is connected between the supply line 15 and a conductor 26 which is connected to supply line 15 by a manually operable switch 27. An electrical lamp 28 may, if desired, be connected in parallel with the cathode filament 22 across the secondary winding 23. If connected in this manner, the lamp 28 indicates, by its illumination, that the switch 16 has been closed.

The gas-filled discharge device 17 has the characteristic, well known in such devices, that the control electrode operates to permit or prevent the initiation of a discharge between the anode and cathode of the device, depending upon whether the potential of the control electrode is above or below a predetermined value, respectively. Once a discharge has been initiated, however, the control electrode is no longer effective, and the discharge can be stopped only by removing ing the discharge maintaining potential from the anode and cathode.

The output circuit of the discharge device 17 may be traced from supply line 15 through a conductor 30, anode 20, cathode 22, a resistance 31, relay winding 12 and a condenser 32 connected in parallel therewith, through conductor 26 and then through switch 27 to supply line 16. The resistance 31 is a protective resistance intended to limit the current flow through the discharge device 17 in the event of failure of condenser 32. Since the electrical energy is supplied from an alternating source, and since the discharge device 17 is conductive in only one direction, the condenser 32 is provided to maintain continuous energization of relay winding 12. During the half cycles when the device 17 is conductive, hereinafter referred to as the positive half cycles, the condenser 32 is charged and the relay winding is energized directly from the supply line. During the alternate half cycles, hereinafter referred to as the negative half cycles, when the discharge device 17 is nonconductive, the condenser 32 discharges through the winding 12, maintaining the winding substantially continuously energized.

The input circuit of the discharge device 17 may be traced from control electrode 21 through a conductor 33, a variable resistance 34, a fixed resistance 35, and a conductor 36 to cathode 22. The resistance 35 is tapped at 37 and 38 so that portions of it may be shunted by movement of a switch arm 40, which is connected to conductor 36, into engagement with either tap 37 or 38.

A timing condenser 41 is provided, one terminal of which is connected to the conductor 36. The other terminal of condenser 41 is connected to the switch arm 42 of a single pole, double throw switch generally indicated at 43. The switch arm 42 is biased, by means not shown, to engage a stationary contact 44 connected to conductor 33. The switch arm 42 may be manually moved into engagement with another stationary contact 45 which is connected through a fixed resistance 46 to the conductor 26.

A single pole, double throw switch 47 comprises a switch arm 50 which is selectively engageable with a contact 51 connected to conductor 48 and a contact 52 connected through a conductor 53 to supply line 16. When the switch arm 50 is in engagement with contact 51, the energization of the load 11 is controlled by the relay 10, but when the switch arm 50 engages the contact 52, this load 11 is continuously energized.

The load circuit controlled by the relay 10 may be traced from supply line 15 through load 11, switch arm 50, contact 51, a conductor 48, contact 14, and switch arm 13, to conductor 26.

The following table shows, by way of example, values of resistance and capacitance which have been used in one embodiment of the circuit of Figure 1:

| Reference numeral: | Resistance or capacitance |
|---|---|
| 31 | ohms__ 5,000 |
| 32 | microfarad__ .5 |
| 34 | megohms__ .03–5 |
| 35 | do____ 3–5 |
| 41 | microfarads__ 6 |
| 46 | ohms__ 5,000 |
| Power supply | volts A. C__ 110 |

*Operation of Figure 1*

First consider that the switches 27 and 47 are both in open position, so that all the circuits are deenergized. When it is desired to start operation of the system, the switch 27 is closed. As soon as the cathode filament 22 is sufficiently heated, the discharge device 17 becomes conductive during the positive half cycles, when its anode 20 is positive with respect to its cathode 22. At this time, the control electrode 21 is substantially at the same potential as the cathode 22, so that the control electrode 21 does not prevent the discharge device 17 from becoming conductive.

As soon as the device 17 becomes conductive, the relay winding 12 is energized, thereby causing switch arm 13 to move out of engagement with back contact 14. After this takes place, the switch arm 50 may be moved into engagement with contact 51, thereby placing the load 11 under control of the relay 10.

If it is now desired to energize load 11 for a predetermined time, the operator moves the switch arm 42 into engagement with contact 45. This places the condenser 41 in series with the device 17 and in parallel with the relay winding 12. The condenser 41 therefore becomes charged with a polarity such that the terminal connected to the switch arm 42 is negative with respect to the terminal connected to the conductor 36. It is necessary to move the switch arm 42 into engagement with contact 45 only for an instant in order to charge the condenser 41. The operator then releases the switch arm 42, which moves under its own bias back into engagement with contact 44, thereby connecting the negatively charged terminal of condenser 41 to the control electrode 21 of discharge device 17. The potential of control electrode 21 is thereby made substantially negative with respect to that of cathode 22. During the next positive half cycle, the negatively charged control electrode 21 is effective to prevent initiation of a discharge through the device 17. The relay winding 12 therefore is deenergized, and switch arm 13 moves into engagement with contact 14, completing the load circuit and lighting the lamps 11.

As soon as the switch arm 42 engages contact 44, the condenser 41 begins to discharge through the resistances 34 and 35. As the condenser 41 discharges, the potential of control electrode 21 gradually changes in a positive direction. When this potential has changed sufficiently so that the control electrode 21 is no longer sufficiently negative to maintain the discharge device 17 nonconductive, the relay winding 12 is again energized, causing the switch arm 13 to open the circuit to load 11.

By varying the resistances 34 and 35, the time required for the discharge of condenser 41 may be varied, thereby controlling the time during which the lamps in the load 11 are illuminated. The variable resistance 34 and the tap changing switch arm 40 may be calibrated in units of time, so that the operator may preselect any period of time, within the limits of the resistances 34 and 35, during which he desires the lamp to remain illuminated. If desired, the lamp 28 may be positioned adjacent the resistance 34 and switch arm 40, to facilitate reading of their respective scales.

It should be noted that the portion of resistance 35 above the tap 37 may not be shunted or otherwise removed from the condenser discharging circuit. This portion of resistance 35 therefore determines the minimum time of discharge of condenser 41 which may be obtained from this circuit. This portion of resistance 35 is so designed that this minimum time of illumination is just slightly larger than the time required for the relay 10 to move the switch arm 13 into engagement with contact 14. By having this portion of resistance 35 permanently in the circuit, it is impossible for the operator to set the time to a value less than the time required for movement of the relay switch arm, thereby causing unsatisfactory operation of the timer.

The resistance 46 is provided to prevent the condenser 41 from momentarily shunting the relay winding 12 during charging of the condenser.

FIGURE 2

There is shown in Figure 2 an arrangement wherein a pair of load devices are sequentially operated for independently predetermined periods of time.

There are shown in Figure 2 a pair of relays 60 and 61 which respectively control a pair of load devices 62 and 63. Each of the relays 60 and 61 is in turn controlled by one of a pair of electrical discharge devices 64 and 65. The discharge devices 64 and 65 may be for example, gas-filled discharge tubes of the type 2A4G, the same type mentioned in connection with Figure 1.

The relay 60 includes a winding 66 which controls the movement of five switch arms 67, 68, 69, 70 and 71. The switch arm 67 cooperates with a back contact 72, and a front contact 73. The switch arm 68 cooperates with a back contact 74, switch arm 69 cooperates with a front contact 75, switch arm 70 cooperates with a back contact 76, and switch arm 71 cooperates with a front contact 77.

The relay 61 includes a winding 80 which controls the movements of five switch arms 82, 83, 84, 85 and 86. Switch arm 82 cooperates with a front contact 87, and switch arm 83 cooperates with a back contact 89 and a front contact 88. The switch arm 84 cooperates with a back contact 90, switch arm 85 cooperates with a back contact 91 and switch arm 86 cooperates with a front contact 92.

Electrical energy is supplied to the load devices 62 and 63, and to the relays 60 and 61, from a pair of supply lines 95 and 96, which may be connected to any suitable source of alternating electrical energy.

The electrical discharge device 64, which controls the flow of current through the winding 66 of relay 60, includes an anode 97, a control electrode 98, and a cathode filament 99. The cathode filament 99 may be heated from any suitable source of electrical energy, and is herein shown, by way of example, as being supplied with heating current from the secondary winding 100 of a transformer 101 having a primary winding 102. The primary winding 102 is connected between supply line 95 and a conductor 103 which may be connected to supply line 96 by closure of a switch 104.

The output circuit of the discharge device 64 may be traced from supply line 95 through anode 97, cathode 99, a conductor 105, relay winding 66 and a condenser 106 in parallel therewith, conductors 107, 108 and 103, and switch 104 to supply line 96.

The input circuit of the discharge device 64 may be traced from control electrode 98 through a conductor 110, a variable resistance 111 and a conductor 112 to the cathode filament 99. A timing condenser 113 has one terminal connected to the conductor 112, and its other terminal connected to a conductor 114. The conductor 114 may be connected to the conductor 110 either by engagement of the switch arm 86 with contact 92, or by engagement of switch arm 67 with contact 72. When either of these connections is completed, the condenser 113 is connected in parallel with the variable resistance of 111.

The discharge device 65, which controls the energization of relay winding 80 includes an anode 117, a control electrode 118, and a cathode filament 119. The filament 119 is supplied with electrical energy for heating purposes from the secondary 120 of a transformer 121 having a primary winding 122. The upper terminal of primary winding 122 is connected to supply line 95 through a conductor 123. The lower terminal of primary winding 122 may be connected to conductor 103 either through a conductor 124, contact 77, switch arm 71, and a conductor 125, or through a conductor 126, a switch arm 127, a contact 128 and a conductor 129.

The output circuit of the discharge device 65 may be traced from supply line 95 through anode 117, cathode filament 119, a conductor 131, relay winding 80 and a parallel condenser 132, conductor 124, contact 77, switch arm 71, and conductor 125 to conductor 103.

The input circuit of discharge device 65 may be traced from control electrode 118 through a conductor 133, a variable resistance 134, and a conductor 135 to cathode 119. A timing condenser 136 has one of its terminals connected to conductor 135 and its opposite terminal connected to a conductor 137. The conductor 137 may be directly connected to the conductor 133 either by closure of switch arm 83 against the back contact 89 or by closure of switch arm 69 against the front contact 75. Upon closure of either of these connections, the condenser 136 is connected in parallel with resistance 134.

The switch arm 127 is part of a relay 140, having a winding 141. In addition to controlling the movements of switch arm 127 with respect to front contact 128, the winding 141 also controls the movements of a switch arm 142 with respect to a front contact 143, and the movements of a switch arm 138 with respect to a front contact 139.

The following table shows, by way of example, values of resistance and capacitance which have been used in one embodiment of the circuit of Figure 2:

| Reference numeral: | Resistance or capacitance | |
|---|---|---|
| 106, 132 | microfarad | .5 |
| 111, 134 | megohms | .01–10 |
| 113, 136 | microfarads | 2 |
| 147, 156 | ohms | 5,000 |
| Power supply | volts A. C. | 110 |

Operation of Figure 2

The parts are shown on the drawings in the positions they assume when the entire system is deenergized. When it is desired to start operation of the load devices 62 and 63, the switch 104 is closed, thereby completing an energizing circuit for winding 102 of the transformer 101. Energization of transformer primary winding 102 causes heating of cathode filament 99 by secondary winding 100. As soon as the filament 99 is hot enough to permit the discharge device 64 to be conductive, a discharge takes place therethrough on every positive half cycle, since at this time the control electrode 98 is at substantially the same potential as the cathode 99 and is therefore ineffective to prevent the initiation of such a discharge. When the discharge device 64 becomes conductive, the relay winding 66 is energized, causing switch arm 67 to move out of engagement with contact 72 and into engagement with front contact 73. At the same time, switch arms 68 and 70 are moved out of engagement with contacts 74 and 76 respectively, and switch arms 69 and 71 are moved into engagement with front contacts 75 and 77 respectively.

Engagement of switch arm 67 with front contact 73 completes a connection between the lower terminal of condenser 113 and the conductor 103. This connection may be traced from condenser 113 through conductor 114, switch arm 67, contact 73, a conductor 145, contact 91, switch arm 85, a conductor 146, and a fixed resistance 147 to conductor 103. The condenser 113 is thereby connected in series with the device 64 and in parallel with the relay winding 66. The condenser 113 therefore becomes charged with a polarity such that its lower terminal, as it appears in the drawings, is negative.

Movement of switch arm 68 out of engagement with contact 74 opens the circuit to load device 62, but since this circuit is already open at switch arm 138, the operation of switch arm 68 has no effect.

Engagement of switch arm 69 with contact 75 connects conductors 133 and 137, but has no effect on the system since these conductors are already connected through switch arm 83 and contact 89.

Disengagement of switch arm 70 from back contact 76 likewise has no effect on the system at this time, since the contact 76 is not connected with any other part of the system.

Engagement of switch arm 71 with contact 77 completes an energizing circuit for primary winding 122 of transformer 121. When primary winding 122 is energized, the cathode element 119 is heated because of the corresponding energization of secondary winding 120. As soon as the filament is hot enough to permit the discharge device 65 to become conductive, a discharge takes place therethrough on each positive half cycle, thereby energizing relay winding 80. Since the control electrode 118 is at this time at substantially the same potential as cathode 119, the control electrode 118 is ineffective to prevent initiation of such discharges.

Energization of relay winding 80 causes switch arm 82 to move into engagement with front contact 87, switch arm 83 to move out of engagement with back contact 89 and into engagement with front contact 88, switch arm 84 to move out of engagement with contact 90, switch arm 85 to move out of engagement with contact 91, and switch arm 86 to move into engagement with contact 92.

Engagement of switch arm 82 with contact 87 completes an energizing circuit for winding 141 of relay 120, which may be traced from supply line 95, through winding 141, a conductor 150, contact 87, switch arm 82, and conductors 151 and 129 to conductor 103.

Engagement of switch arm 83 with contact 88 produces no immediate effect on the system, since the contact 88 is at this time disconnected from all other parts of the system.

Disengagement of switch arm 84 from contact 90 causes opening of the circuit through the load device 63, but since this circuit is already open at switch arm 138, the operation of switch arm 84 has no effect.

Disengagement of switch arm 85 from contact 91 opens the connection through which the condenser 113 has been charging. Engagement of switch arm 86 with contact 92 connects the negative terminal of the charged condenser 113 to the control electrode 98 through the conductor 110. The potential of control electrode 98 is therefore reduced considerably below that of cathode 99 and is effective to prevent initiation of discharges through the device 64 during the positive half cycles. Relay winding 66 is therefore deenergized, and remains deenergized until the charge on condenser 113 has leaked out through the variable resistance 111. It will be understood that by adjusting the resistance 111, the time required for the charge to leak off the condenser 113 may be varied, and hence the duration of the interval during which relay winding 66 is maintained deenergized may be determined.

Energization of winding 141 of relay 140 causes movement of switch arm 142 into engagement with contact 143, completing a holding circuit for winding 141, and likewise causes movement of switch arm 127 into engagement with contact 128, completing an energizing circuit for primary winding 122 which is independent of switch arm 71 and relay 60. At the same time, the switch arm 138 engages contact 139, placing load devices 62 and 63 under control of relays 60 and 61, respectively.

Deenergization of relay winding 66 causes switch arm 67 to move out of engagement with front contact 73 and into engagement with back contact 72. At the same time, switch arms 68 and 70 are moved into engagement with back contacts 74 and 76, respectively, and switch arms 69 and 71 are moved out of engagement with front contacts 75 and 77, respectively.

Engagement of switch arm 67 with contact 72 completes a connection which maintains the condenser 113 in parallel with resistance 111. Since a parallel connection has been previously completed by engagement of switch arm 86 with contact 92, engagement of switch arm 67 with contact 72 produces no immediate effects on the operation of this system, but merely ensures that the connection of condenser 113 to control electrode 110 is maintained until the condenser is discharged enough to permit tube 64 to again become conductive.

Engagement of switch arm 68 with contact 74 completes the energizing circuit for load 62 which may be traced from positive supply line 95 through load 62, a conductor 153, contact 74, switch arm 68, conductors 154 and 144, switch arm 138 and contact 139 to conductor 103. The period of energization of load device 62 is of course dependent upon the period of deenergization of relay 60, and hence is determined by the setting of resistance 111.

Disengagement of switch arm 69 from contact 75 opens the connection between the lower terminal of condenser 136 and conductor 133, while engagement of switch arm 70 with contact 76 completes a connection between the lower terminal of condenser 136 and the conductor 103. This latter connection may be traced from condenser 136 through conductor 137, switch arm 83, contact 88, conductor 155, contact 76, switch arm 70 and resistance 156 to conductor 103. The condenser 136 is therefore connected in series with the device 65 and in parallel with the relay winding 80. The condenser 136 therefore is charged with a polarity such that its lower terminal is negative.

As the condenser 113 discharges through resistance 111, the control electrode 98 gradually becomes more positive, and eventually reaches a value such that discharge device 64 again becomes conductive. As soon as the discharge device 64 is again conductive, relay winding 66 is energized, thereby operating switch arm 68 away from contact 74 and deenergizing the circuit of load device 62. At the same time, switch arm 67 is moved into engagement with contact 73 but since switch arm 85 is at this time disengaged from contact 91, the engagement of switch arm 67 with contact 73 has no effect on the operation of the system.

Energization of winding 66 also causes switch arm 70 to move out of engagement with contact 76, thereby opening the connection through which the condenser 136 has been charging, while movement of switch arm 69 into engagement with contact 75 connects the negatively charged terminal of condenser 136 through conductor 133 to control electrode 118, thereby biasing the latter negatively and causing it to prevent initiation of any further discharge through the device 65 on the succeeding positive half cycles. Relay winding 80 is accordingly deenergized.

Switch arm 71 is moved into engagement with contact 77 at this time, but has no effect on the system since it is shunted by engagement of switch arm 127 with contact 128.

Deenergization of winding 80 causes switch arm 85 to move into engagement with contact 91, thereby reestablishing the charging connection for condenser 113, and switch arm 86 moves out of engagement with contact 92, thereby opening the connection between the lower terminal of condenser 113 and the control electrode 98. At the same time, switch arm 84 moves into engagement with contact 90, thereby establishing an energizing circuit for load device 63, which may be traced from supply line 95 through load device 63, a conductor 160, contact 90, switch arm 84, conductors 161 and 144, switch arm 138, and contact 139 to conductor 103.

The relay winding 80 remains deenergized, and the load 63 remains energized, for a period of time determined by the time required for the condenser 136 to dissipate its charge through the resistance 134. By the manipulation of resistance 134, this period of time may be changed to suit the will of the operator.

As soon as the condenser 136 has discharged sufficiently, the relay winding 80 is again energized, and the entire cycle of operation described above is repeated.

It should therefore be apparent that I have shown in Figure 2 an arrangement whereby two load devices, 62 and 63 are sequentially energized, each for a predetermined period of time, and that these sequential energizations are cyclically repeated. When it is desired to terminate the sequential energizations of these load devices, the switch 104 is opened. It should also be understood that this system may be utilized where it is desired to energize and deenergize a single load device cyclically. In such a case, one of the load devices 62 and 63 would be omitted. The system would otherwise be the same.

FIGURE 3

In Figure 3 is shown a system which is adapted to control the energization of a single load device in predetermined cycles. The system of Figure 3 is designed so that the single load device may selectively be energized instantaneously, the energizations being spaced by variously timed intervals, or the load device may be energized for certain timed intervals and deenergized for other independently timed intervals. Furthermore means are provided so that the system may produce either a single sequence of energization and deenergization of the load device, or cyclically repeated sequences.

The single load device is shown as an electrical winding 200. This winding 200 may be the winding of an electromagnet which operates the shutter of a camera, such as the electromagnet 201 of Figure 4. It should be readily recognized however, that the principles shown in the system of Figure 3 are applicable to other devices than the camera shutter operator of Figure 4.

The energization and deenergization of the load device 200 is controlled by a pair of relays 202 and 203. The relay 202 includes an electrical winding 204 which controls the movement of a first switch arm 205 between a back contact 206 and a front contact 207, a second switch arm 208 between a back contact 209 and a front contact 210, and a third switch arm 211 between a back contact 212 and a front contact 213.

The relay 203 includes a winding 216 which controls the movement of three switch arms. A first switch arm 217 is moved between a back contact 218 and a front contact 219. A second switch arm 220 is moved between a back contact 221 and a front contact 222. The third switch arm 223 is moved between a back contact 224 and a front contact 225.

The energization of the relay windings 204 and 216 are controlled, respectively, by a pair of discharge devices 230 and 231. These discharge devices may be, for example, gas filled tubes of type 2050.

The discharge device 230, which controls the energization of relay winding 204, comprises an anode 232, a screen electrode 233, a control electrode 234, a cathode 235, and a heater filament 236. The discharge device 231, which controls the energization of relay winding 216, includes an anode 237, a screen electrode 238, a control electrode 239, a cathode 240, and a heater filament 241.

The system of Figure 3 is adapted for energization by a source of unidirectional electrical energy, although it should be understood that alternating electrical energy may be used if desired. If alternating current were used, condensers should be connected in parallel with the relay windings 203 and 204, such as the condenser 32 of Fig. 1. The relay windings 204 and 216, and the load device 200 are supplied with electrical energy from supply lines 243 and 244. A master switch 242 is connected in supply line 244 in order that the entire system may be deenergized. The heater filament 236 is energized from a circuit which may be traced from the supply line 243 through a resistance 245, a conductor 246, heater filament 236, and a conductor 247 to supply line 244. The heater filament 241 is energized through a similar circuit which may be traced from positive supply line 243 through a resistance 250, a conductor 251, heater filament 241, and a conductor 252 to negative supply line 244.

The output circuit of the discharge device 230 may be traced from positive supply line 243 through a conductor 253, anode 232, cathode 235, relay winding 204, a conductor 254, either front contact 221 or back contact 222, switch arm 220, a conductor 255 and conductor 252 to negative supply line 244. The input circuit of the discharge device 230 may be traced from control electrode 234 through a first variable resistance 256, a second variable resistance 257, and a conductor 258 to cathode 235. A timing condenser 260 has one of its terminals connected to cathode 235 through conductor 258. The other terminal of condenser 260 is connected through a resistance 261 and a conductor 262 to switch arm 217. When the switch arm 217 engages back contact 218, this other terminal of condenser 260 is connected to the negative supply line 244, the connection continuing from back contact 218 through a conductor 263, back contact 221 or front contact 222, switch arm 220 and conductors 255 and 252 to negative supply line 244. When the switch arm 217 engages the front contact 219, the condenser 260 is connected in parallel with the variable resistances 256 and 257. This connection has been traced from condenser 260 to switch arm 217, and may be further traced from front contact 219 through a conductor 264 to control electrode 234.

The output circuit of the discharge device 231 may be traced from positive supply line 243 through a conductor 265, anode 237, cathode 240, relay winding 216, a conductor 266, a stationary contact 267, a movable switch blade 268, a stationary contact 269, a conductor 270, either back contact 209 or front contact 210, switch arm 208, a manually operable switch 271, and conductor 247 to negative supply line 244. The input circuit of the discharge device 231 may be traced from control electrode 239 through a first variable resistance 273, a second variable resistance 274, and a conductor 275 to cathode 240.

A timing condenser 276 has one of its terminals connected to cathode 240 through conductor 275. The other terminal of condenser 276 may be connected either to negative power supply line 244, for purposes of charging the condenser, or to control electrode 239, in order to bias the control electrode negatively. Two connections are provided through either of which the lower terminal of condenser 276 may be connected to negative supply line 244. One of these connections may be traced from the lower terminal of condenser 276 through a resistance 277, a contact 278, a switch blade 279, a contact 280, a conductor 281, switch arm 205, a contact 206, a manually operable switch 282, either front contact 210 or back contact 209, switch arm 208, switch 271, and conductor 247 to negative supply line 244. The alternative connection between the lower terminal of condenser 276 and negative supply line 244 may be traced from condenser 276 through resistance 277, a conductor 284, contact 285, switch blade 279, a contact 286, conductor 270, back contact 209 or front contact 210, switch arm 208, switch 271 and conductor 247 to negative supply line 244. This alternative connection is supplied for the purpose of bypassing the switch arm 205 and the manually operated switch 282 under certain conditions of operation to be described later.

When the switch arm 205 engages the front contact 207, the lower terminal of condenser 276 is connected to control electrode 239. This connection may be traced from condenser 276 through resistance 277, contact 278, switch blade 279, contact 280, conductor 281, switch arm 205, contact 207, and a conductor 288 to control electrode 239.

The switch blades 268 and 279 and the contacts cooperating therewith, are part of a manually operable switch 287. The switch 287 is biased, by means not shown, so that the switch blade 279 normally completes a connection between contacts 278 and 280, and the switch blade 268 completes a connection between contacts 267 and 269. The switch 287 may be manually operated against its bias however, so that the switch blade 268 opens the connection between contacts 267 and 269, and switch blade 279 opens the connection between contacts 278 and 280 and completes another connection between contacts 285 and 286.

The variable resistances 257 and 274 are simultaneously operable in opposite senses by means of a single manual operator 290. The operator 290 includes an arm pivoted at 291 and having an extension 292 engaging the resistance 257, and an extension 293 engaging resistance 274. Electrical connections 294 and 295 are provided between the extensions 292 and 293, respectively, and the upper terminals of their associated resistances. The extensions 294 and 295 are suitably insulated from each other.

A manually operable switch 297 is provided for shunting the switch arm 220 and completing a connection between conductor 254 and conductor 252.

A switch 300 is provided, which when closed places the load device 200 under the control of the relays 202 and 203. The energization of the load device 200 is controlled by the switch arm 211 of relay 202 and switch arm 223 of relay 203. A double pole, double throw switch 301 determines whether the load 200 is to be energized momentarily upon engagement of either switch arm 211 or 223 with its associated front contact, or continuously upon engagement of switch arm 211 with its associated back contact. The switch 301 comprises a pair of blades 302 and 303, which are simultaneously movable by a handle 304 to engage either a pair of upper contacts 305 and 306, respectively, or a pair of lower contacts 307 and 308, respectively.

A pair of load operating condensers 310 and 311 are provided. When switch 300 is closed, and switch 301 is in its upper position, an energizing circuit for condenser 310 may be traced from positive supply line 243 through a conductor 312, condenser 310, a resistance 313, a conductor 314, contact 305, switch blade 302, a conductor 315, switch arm 211, contact 212, conductors 316 and 317 and switch 300 to negative supply line 244. Completion of this circuit causes condenser 310 to become charged. When the switch arm 211 next engages its front contact 213, the charge on the condenser 310 is dissipated through the load device 200. This discharging circuit of the condenser 310 may be traced from its lower terminal through resistance 313, conductor 314, switch blade 302, conductor 315, switch arm 211, front contact 213, conductors 318 and 319, contact 306, switch blade 303, a conductor 320, load device 200, a conductor 321, positive supply line 243 and a conductor 312 to the upper terminal of condenser 310. The discharging of condenser 310 causes a momentary current flow through the load device 200 and a corresponding instantaneous operation of the load device.

In a similar manner it may be seen that when switch arm 223 engages its back contact 224, a charging circuit is completed for condenser 311, which may be traced from positive supply line 243 through condenser 311, a resistance 325, a conductor 326, switch arm 223, back contact 224, and conductors 316 and 317 and switch 300 to negative supply line 244. After condenser 311 is charged, when switch arm 223 next engages front contact 225, a discharging circuit for condenser 311 is completed. This discharging circuit may be traced from the lower terminal of condenser 311 through resistance 325, conductor 326, switch arm 223, front contact 225, conductors 318 and 319, contact 306, switch blade 303, conductor 320, load device 200, conductor 321, positive supply line 243 and conductor 324 to the upper terminal of condenser 311.

When the switch 301 is in its lower position, then the switch blades 302 and 303 engage contacts 307 and 308, respectively, and the load device is energized only when switch arm 211 engages its back contact 212. This energizing circuit for the load device 200 may be traced from positive supply line 243 through conductor 321, load device 200, conductor 320, switch blade 303, contact 308, a conductor 327, contact 307, switch blade 302, conductor 315, switch arm 211, back contact 212, conductors 316 and 317, and switch 300 to negative supply line 244.

The following table shows, by way of example, values of resistance and capacitance which are suitable for use in the circuit of Figure 3:

| Reference numeral: | Resistance or capacitance | |
|---|---|---|
| 256, 273 | megohms | 0–5 |
| 257, 274 | do | 0–1 |
| 260, 276 | microfarads | 2 |
| 261, 277 | ohms | 5000 |
| 310, 311 | microfarads | 6 |
| 200, 313, 325 | ohms | 2500 |
| Power supply | volts D. C. | 110 |

FIGURE 4

There is shown in Figure 4 a camera 330 of conventional type, having a shutter operator 331 which is biased upwardly to the position shown in the drawings, and which is movable downwardly a short distance to operate an internal shutter mechanism, not shown. The shutter mechanism is adjustable for different modes of operation by adjusting means including a pointer 332 movable across a scale 333, which is provided with the legend, "I. T. B." These initials are abbreviations for "Instantaneous," "Time," and "Bulb," respectively. This mechanism is of a conventional type well known in commercial cameras. When the pointer 332 is moved adjacent the legend "I," each downward movement of the shutter operator 331 causes an instantaneous opening and an immediate reclosing of the camera shutter.

When the pointer 332 is placed adjacent the legend "B" on the scale 333, each downward movement of operator 331 opens the camera shutter, and the following upward movement of the operator 331 closes the camera shutter. The time between the downward and upward movements of the operator 331 is determined on the usual camera by a mechanical timing arrangement such as indicated diagrammatically at 334. When such a camera is used with an electrical timing arrangement such as disclosed in Figure 3, however, the mechanical timing arrangement 334 is unnecessary.

When the pointer 332 is moved adjacent the legend "T" on the scale 333, one downward movement of the operator 331 opens the shutter, and the return upward movement has no effect on the shutter. The shutter is closed by again moving the operator 331 downward, the return upward movement again having no effect.

For moving the shutter operator 331, an electromagnet 201 may be provided, having a coil 200 which corresponds to the load device 200 of Figure 3. The electromagnet 201 operates an armature 335 to which is attached a link 336 connected to the shutter operator 331. When the pointer 332 is set for either the "instantaneous" or "time" operation of the shutter, a single mechanical impulse, such as is provided by a momentary energization of the electromagnet 201, is sufficient to move the shutter operator 331 from its upper to its lower position, are necessary. When the pointer 332 is set for "bulb" operation of the camera shutter, the coil 200 of electromagnet 201 should be energized for a predetermined time, which is the length of the time the shutter is to remain open.

Each of the relays 202 and 203 operate three switch arms. The first switch arms 205 and 217, control the charging or discharging of the condenser connected in the timing circuit associated with the opposite relay. That is, the switch arm 205 controls the charging or discharging of the condenser 276, and the switch arm 217 controls the charging or discharging of the condenser 260. The switch arms 208 and 220 each operate to interrupt the output circuit of the discharge device associated with the other relay momentarily during the time the switch arm 208 or 220 is passing between its back and front contacts or vice versa. The third switch arms 211 and 223 control the energizations of the load device 200.

The switch arms 205 and 217 are so related mechanically to their respective associated switch arms 208 and 220, that upon energization of the relay windings, the switch arms 205 and 217 engage their respective front contacts 207 and 219 before the switch arms 208 and 220 engage their respective front contacts 210 and 222. The purpose of this mode of construction will become apparent from a consideration of the operation of the complete system, as set forth below.

*Operation of Figures 3 and 4*

Although the operation of the timing system shown in Figure 3 will be described in connection with a camera shutter operator such as that described diagrammatically in Figure 4 it will be understood that the timing arrangement of Figure 3 is not limited in its utility to the operation of a camera shutter.

*"Time" or "instantaneous" exposure*

Let it be assumed that it is desired to operate the camera with the pointer set at the legend "T" of the scale 333. More specifically, it is desired to open the camera shutter a predetermined time after the system is started, to maintain the shutter open for a different predetermined time and then to close it. The opening and the closure of the shutter, when the pointer 332 is set at "T," each require a momentary energization of the coil 200. Since momentary energizations of the coil 200 are desired, the switch 301 is operated by the handle 304 to its upper position, as shown by the full lines in the drawings. If a single sequence is desired, the switch 282 is opened, as shown in the drawings. When the system is to be started up, the switch 300 should be open so that the load 200 is not under control of the relays 202 and 203 during the preliminary starting period and the switch 271 should also be open.

If a cycle of operation such as that described above is desired, the variable resistances 273 and 274 should be set to determine the period of time after initiation of the cycle and before the shutter is opened, and the resistances 256 and 257 should be set to determine the time the shutter is to remain open. The various resistances may be provided with scales calibrated in units of time so that these adjustments may be readily made. The single controller 290 would be provided with a zero center scale. Normally the controller 290 would be left at its zero center position when this sequence is used, and the setting established by means of resistances 256 and 273. The single controller 290 is provided for use in a situation where this sequence is desired for taking pictures at night with an independently timed flash illumination. In such a situation, the resistance 273 is set for the same time as the flash timer. The resistance 256 is set to determine the time after the flash during which the shutter is to remain open, and the controller 290 is set to determine the time before the flash which the shutter is to remain open. It is necessary under circumstances to have the shutter open both before and after the flash time, in order that errors in coordination of the flash timer and the camera timer will not cause the shutter to be closed at the time the flash occurs.

When the resistances 256 and 273 and the controller 290 have been set to their desired position, the switch 242 may be closed to energize the control system. When switch 242 is closed the heater filaments 236 and 241 are energized, and after they have become warmed up, the discharge device 230 becomes conductive. The discharge device 231 does not conduct at this time, since the switch 271 in its output circuit is open. When the discharge device 230 becomes conductive, the relay 202 is energized. As soon as the relay 202 is energized, the operator should close the switch 297, which is biased open, and close the switch 271 while the switch 297 is held closed. Closure of switch 271 completes the output circuit of the discharge device 231, and the latter becomes conductive, energizing relay 203. Since the switch 297 has been held closed, the output circuit of the discharge device 230 has not been interrupted, and therefore both relays 202 and 203 are now energized. The preliminary starting period is over and the system is ready to start timing the energization of electromagnet 201.

When the two relays have been simultaneously energized, the switch 300 is closed, placing the shutter operating electromagnet 201 under control of the relays 202 and 203.

The system is now ready to start the desired sequence of operation of the camera shutter. The sequence is started by depressing and releasing the switch 287 while holding the switch 297 closed. If desired, these switches might be so constructed that their operation is mechanically coordinated. In other words the switch 297 might be interlocked with switch 287 so that 297 is closed whenever 287 is away from its normal position. Holding the switch 297 closed maintains the relay 202 energized and thereby prevents false operation of the camera shutter. When the switch 287 is depressed, the energization of relay winding 216 is interrupted by the operation of the switch blade 268. At the same time, the switch blade 279 completes a connection between contacts 285 and 286, thereby providing the discharge device 231 with an output circuit which may be traced from supply line 243 through conductor 265, anode 237, cathode 240, conductor 275, condenser 276, resistance 277, contact 285, switch blade 279, contact 286, conductor 270, front contact 216, switch arm 208, switch 271, and conductor 247 to negative supply line 244. The flow of current through the circuit last traced charges the condenser 276 with a polarity such that its upper terminal is positive and its lower terminal negative. Since the resistance in this circuit is rather low, the condenser 276 is charged quickly. When the switch 287 is released, the output circuit of the discharge device 231 is momentarily interrupted. The switch 287 is so constructed that before the output circuit of device 231 is completed again by closure of switch blade 268 against contacts 267 and 269, the negatively charged terminal of condenser 276 is connected to the control electrode 239 through the connection including contact 278, switch blade 279, and contact 280. A negative potential is therefore applied to the control electrode 239 before the output circuit of discharge device 231 is completed. This negative potential prevents the initiation of a discharge through the device 231, and maintains the relay 203 deenergized. The relay 203 remains deenergized for a period of time determined by the time required for condenser 276 to discharge through the resistances 273 and 274. When the relay winding 216 is first deenergized, the switch arm 223 moves into engagement with back contact 224, thereby connecting the condenser 311 to the charging circuit previously traced.

When the condenser 276 has discharged sufficiently that the voltage maintained by it on control electrode 239 is not sufficiently negative to maintain the discharge device 231 cutoff, the discharge through the device 231 is reestablished, thereby reenergizing the relay winding 216.

When the relay winding 216 is reenergized, the resultant operation of switch arm 220 momentarily opens the output circuit of the discharge device 230. The switch arms 220 and 217 are so constructed that switch arm 217 engages its front contact 219 before arm 220 engages its front contact 222. The condenser 260, which has been charging while the relay 216 was deenergized, has its negative terminal connected to the control electrode 234 of discharge device 230 by the action of switch arm 217. The negative potential thereby applied to the control electrode 234 prevents the reestablishment of a discharge through the device 230 when the output circuit is completed by engagement of switch arm 220 with contact 222.

When the relay winding 216 is reenergized, switch arm 223 is moved into engagement with front contact 225, completing a circuit whereby the condenser 311 is discharged through the winding 200. The winding 200 is thereby momentarily energized to move the shutter operator 331 downwardly, opening the shutter.

Deenergization of the relay winding 204 results from the interruption of the discharge through device 230 by the negative potential applied to control electrode 234. This deenergization of relay winding 204 causes switch arm 211 to move into engagement with back contact 212, thereby completing the charging circuit previously traced for condenser 310. The relay winding 204 remains deenergized for a time determined by the time required for condenser 260 to discharge through resistances 256 and 257. As soon as the condenser 260 has discharged sufficiently to permit the device 232 to again become conductive, switch arm 211 is moved into engagement with contact 213, thereby completing a discharging circuit for condenser 310 through the winding 200. This discharging circuit of condenser 310 has been previously traced. The winding 200 is again momentarily energized to close the shutter.

When the switch 282 is open, the switch arm 205 is not effective when it engages its back contact 206 to recharge the condenser 276. Therefore after each relay has been deenergized and reenergized once, both relays remain energized again until the system is shut down.

If the switch 282 is closed, however, the engagement of switch arm 205 with contact 206 results in the recharging of the condenser 276 and when the relay winding 204 is again energized, the output circuit of device 231 is again momentarily interrupted by the operation of switch arm 208, and during this interruption, the negative terminal of condenser 276 is connected to the control electrode 239, thereby again cutting off the discharge through the device 231 and starting the cycle all over again. Therefore if the switch 282 is closed, the sequence previously described will be cyclically repeated.

When the pointer 332 is set opposite the legend "I" on the scale 333, the operation of the timer may be the same as described above. Under these conditions, the shutter of the camera will be instantaneously opened and closed at spaced intervals. These intervals may if desired be made equal. On the other hand, it might be desirable to make one interval very short and the other one quite long, as for instance when a camera is used to make stereoscopic pictures during an aerial survey.

*"Bulb" exposure*

When the pointer 332 is set opposite the legend "B" on the scale 333, the camera shutter is held open whenever the shutter operator 331 is held down, and is closed whenever the operator 331 moves to its normal position under its bias. When the timer of Figure 3 is used with the camera adjusted for this mode of operation, the operation of the timer circuit may be the same as that previously disclosed, except that the switch 301 is operated by handle 304 so that the switch blades 302 and 303 take up the position shown by the dotted lines in the drawing. Under these conditions, the winding 200 is energized only when the switch arm 211 engages the back contact 212. It may therefore be seen that the shutter is held closed while the relay 202 is energized, and is open whenever the relay 202 is deenergized. By following the sequence of timer operation previously set forth, it may be seen that the shutter will first be held closed for a predetermined period of time which is established by the settings of resistances 273 and 274, and will then be opened for a predetermined time established by the settings of the resistances 256 and 257. As in the previous case, a single sequence of this kind may be obtained by opening the switch 282, and repeated sequences of this type will be obtained when the switch 282 is closed.

If it is desired to open the shutter and mantain it open for a predetermined interval, with no time delay before the opening of the shutter, then switches 271 and 282 are both opened, and the switch 301 is moved to its lower position, so that the winding 200 is energized when switch arm 211 engages back contact 212. The switch 300 is opened during the preliminary starting period.

When the timer is to be started, the master switch 247 is closed. After the filaments 236 and 241 become heated, discharge device 230 becomes conductive, and the relay winding 202 is energized. At the same time, condenser 260 is charged. The relay winding 216 is not energized, since its circuit is open at switch 271. As soon as relay winding 202 is energized, the switch 300 may be closed, placing electromagnet 201 under control of relay 202.

The resistances 256 and 257 are set to determine the length of time the shutter is to remain open. Then in order to start operation of the timer, the switch 271 is closed. This completes the output circuit of discharge device 231 through the relay winding 216. Energization of winding 216 causes switch arm 217 to move out of engagement with back contact 218 and engage front contact 219. The negative terminal of the charged condenser 260 is thereby connected to the control electrode 234. At the same time, the output circuit of the device 230 is momentarily interrupted by movement of switch arm 220 between contacts 221 and 222. The negative potential applied to control electrode 234 prevents the initiation of a discharge through the device 230 after the interruption is over. The device 230 therefore becomes nonconductive and remains so for a time dependent upon the time required for condenser 260 to discharge through resistances 256 and 257.

While the device 230 is non-conductive, the relay winding 204 is deenergized, and switch arm 211 engages back contact 209, completing an energizing circuit for winding 200, and thereby holding the camera shutter open. It may therefore be seen that, with this mode of operation, the shutter is opened and maintained open for a predetermined interval, with no time delay before the shutter opening.

The last described sequence above may be cyclically repeated, if desired, by closing the switch 282. The sequence differs from the previous sequence only in that it starts with a "shutter open" period instead of a "shutter closed" period.

FIGURE 5

There is shown in Figure 5 an arrangement of timing resistances 340 and 341 operated by a single controller 342, which may be substituted for, or used in addition to the timing resistances 257 and 274 in the circuit shown in Figure 3. The controller 342 includes an operating lever 343 pivoted at 344 and having an extension 345 engaging the resistance 340 and an extension 346 engaging the resistance 341. The extensions 345 and 346 are suitably insulated from each other. The upper end of resistance 340 is connected to extension 345 by a conductor 347 while the lower end of resistance 341 is connected to extension 346 by a conductor 348. The lever 343 is indicated as being rotated about its pivot 344 by a link 350 operatively attached to a pressure responsive bellows 351.

It is believed to be apparent from an inspection of Figure 5 that a rotation of the lever 343 about its pivot 344 changes the resistance in both timing circuits in the same sense at the same time. Therefore operation of this lever 343 will increase both the time of operation of relay 202 and the time of operation of relay 303. The relative proportion of each cycle of timer operation during which each relay is deenergized, is not disturbed by the operation of this lever 343. Comparing the operation of controller 342 with the operation of controller 290, it may be stated that the controller 342 changes the length of a cycle of deenergization and energization of both the relays without disturbing the proportion of the cycle length during which the relay is deenergized. On the other hand, the controller 290 changes the proportion of the cycle length during which a given relay is deenergized, without changing the length of the cycle.

The arrangement shown in Figure 5 has especial utility when taking stereoscopic aerial survey pictures. When the timer is used for such purposes, the bellows 351 is made responsive to the altitude of the plane taking the pictures. Then, as the plane changes altitude, the timing of the pictures is changed so that the overlap between sequentially exposed pictures remains the same regardless of changes in altitude.

It should be apparent that the timing circuit disclosed in Figure 3 is adaptable for operating other load devices than the winding 200, and might be used to operate separate load devices in the manner disclosed in Figure 2. The utility of the controllers 290 and 342 is also not limited to a timer for a camera shutter operating arrangement, but has other utility as well. Furthermore, the controller 342 may be substituted for the controller 290. An arrangement might be desirable wherein the resistance 257 was connected in series with the resistance 340 of Figure 5 and the resistance 274 connected in series with the resistance 341 of Figure 5. It is, of course, not necessary that the controller 342 be operated in response to altitude, as it may be manually operated, or responsive to some other variable condition. In such an arrangement, convenient and separate adjustments would be provided whereby the length of an operating cycle could be changed without disturbing the proportion of "on" and "off" times within the cycle, and also the proportion of "on" and "off" times could be changed without disturbing the length of the cycle.

While certain preferred embodiments of my invention have been disclosed herein, it should be understood that other modifications thereof will occur to those who are skilled in the art, and I therefore wish my invention to be limited only by the scope of the appended claims.

I claim as my invention:

1. Electrical timing apparatus, comprising in combination, normally electrically energized current responsive means to be deenergized for a predetermined time, a pair of power supply terminals adapted for connection to a source of electrical energy, an electrical discharge device including an anode, a cathode, and a control electrode, means connecting said anode to one of said power supply terminals, means connecting said current responsive means between said cathode and said other power supply terminal, means connecting said cathode and said control electrode including an electrical resistance, a condenser having a pair of terminals, means connecting one of said condenser terminals to said cathode, and switch means for selectively connecting the other of said condenser terminals to said other power supply terminal to charge said condenser and to said control electrode to discharge said condenser through said resistance.

2. Electrical timing apparatus, comprising in combination, normally electrically energized current responsive means to be deenergized for a predetermined time, a pair of power supply terminals adapted for connection to a source of electrical energy, an electrical discharge device having an anode and a cathode adapted to sustain a discharge therebetween and a control electrode adapted to prevent such a discharge when a predetermined negative electrical potential is applied thereto, means connecting said anode to one of said power supply terminals, means connecting said current responsive means between said cathode and said other power supply terminal, means connecting said cathode and said control electrode including an electrical resistance, a condenser having a pair of terminals, means connecting one of said condenser terminals to said cathode, switch means for selectively connecting the other of said condenser terminals to said other power supply terminal to charge said condenser so as to render said other condenser terminal negative and to said control electrode so as to prevent a discharge through said device for a time determined by the time required for the charge on said condenser to leak off through said resistance, and means for varying said resistance so as to control the time during which such discharge is prevented.

3. Electrical timing apparatus comprising in combination, a normally energized electrical impedence to be deenergized for a predetermined time, a pair of power supply terminals adapted for connection to a source of electrical energy, an electrical discharge device having an anode and a cathode adapted to sustain a discharge therebetween and a control electrode adapted to prevent such a discharge when negative electrical potential is applied thereto, means connecting said cathode, said anode and said impedence in series to said power supply terminals, means connecting said cathode and said control electrode including a fixed resistance and a variable resistance in series, a condenser, switch means for selectively connecting said condenser across said impedance to charge said condenser and across said resistances with the polarity of said charge such as to apply a negative potential to said control electrode to prevent a discharge through said device for a time determined by the time required for the charge on said condenser to dissipate through said resistances, and means for varying said variable resistance so as to control the time during which such discharge is prevented, said fixed resistance serving to establish a minimum time which may not be reduced by operation of said variable resistance.

4. Electrical timing apparatus, comprising in combination, a normally energized electrical impedance to be deenergized for a predetermined time, a pair of power supply terminals adapted for connection to a source of electrical energy, an electrical discharge device having an anode and a cathode adapted to sustain a discharge therebetween and a control electrode adapted to prevent such a discharge when a negative electrical potential is applied thereto, means connecting said cathode, said anode and said impedance in series to said power supply terminals, means connecting said cathode and said control electrode including a variable electrical resistance, a fixed resistance, a condenser, switch means for selectively connecting said condenser across said impedance to charge said condenser and across said resistances in series with the polarity of said charge such as to apply a negative potential to said control electrode to prevent a discharge through said device for a time determined by the time required for the charge on said condenser to dissipate through said resistance, and means for varying said variable resistance so as to control the time during which such discharge is prevented, said fixed resistance serving to establish a minimum time which may not be reduced by operation of said variable resistance.

5. Electrical timing apparatus, comprising in combination, relay means including an electrical winding and an armature movable in accordance with the energization of said winding, said relay means having a characteristic time delay between a change in the energization of said winding and the responsive movement of said armature, means normally maintaining said winding in a predetermined condition of energization and said armature in a predetermined position, means for changing the condition of energization of said winding for a predetermined time, and means for varying said predetermined time above a fixed minimum time greater than said characteristic time delay.

6. Electrical timing apparatus, comprising in combination, relay means including an electrical winding and an armature movable in accordance with the energization of said winding, said relay means having a characteristic time delay between a change in the energization of said winding and the responsive movement of said armature, means normally maintaining said winding in a predetermined condition of energization and said armature in a predetermined position, a condenser, means for charging said condenser, means for discharging said condenser including a fixed resistance and a variable resistance connected in series, means connectable to said condenser for changing the condition of energization of said winding for a predetermined time dependent upon the time required to discharge said condenser, and means for varying said variable resistance to control said predetermined time, said fixed resistance having a value such that said predetermined time cannot be reduced below said characteristic time delay by operation of said resistance varying means.

7. Electrical timing apparatus, comprising in combination, a normally energized electrical impedance to be deenergized for a predetermined time, a pair of power supply terminals adapted for connection to a source of electrical energy, an electrical discharge device having an anode and a cathode adapted to sustain a discharge therbetween and a control electrode adapted to prevent such a discharge when negative electrical potential is applied thereto, means connecting said cathode, said anode and said impedance in series to said power supply terminals, means connecting said cathode and said control electrode including a first electrical resistance, a condenser, a second electrical resistance, switch means for selectively completing a first connection which places said condenser in series with said second resistance across said impedance to charge said condenser, said second resistance preventing said condenser from effectively shunting said impedance, and a second connection which places said condenser across said first resistance with the polarity of said charge such as to apply a negative potential to said control electrode to prevent a discharge through said device for a time determined by the time required for the charge on said condenser to dissipate through said first resistance, and means for varying said first resistance so as to control the time during which such discharge is prevented.

8. Electrical timing apparatus, comprising in combination, a normally energized electrical impedance to be deenergized for a predetermined time, a pair of power supply terminals adapted for connection to a source of electrical energy, an electrical discharge device having an anode and a cathode adapted to sustain a discharge therebetween and a control electrode adapted to prevent such a discharge when a negative electrical potential is applied thereto, means connecting said cathode, said anode and said impedance in series to said power supply terminals, means connecting said cathode and said control electrode including a variable electrical resistance, a condenser, a fixed electrical resistance connected in series with said condenser, switch means for selectively completing a first connection which places said condenser and said fixed resistance in series across said impedance to charge said condenser, said fixed resistance preventing said condenser from effectively shunting said impedance, and a second connection which places said condenser and said fixed resistance in series across said variable resistance with the polarity of said charge such as to apply a negative potential to said control electrode to prevent a discharge through said device for a time determined by the time required for the charge on said condenser to dissipate through said resistances, and means for varying said variable resistance so as to control the time during which such discharge is prevented, said fixed resistance serving in said second connection to establish a minimum time which may not be reduced by operation of said variable resistance.

9. Electrical timing apparatus, comprising in combination, a plurality of electrical relays, each said relay including a winding and switch means operated in accordance with the energization of said winding, means normally maintaining each of said relays in a predetermined condition of energization, means for changing the condition of energization of each of said relays for an independently predetermined period of time, said last-named means comprising, for each relay, an electrical discharge device and condenser means for controlling the conductivity of said discharge device, and means effectively upon the termination of the period of changed energization of each relay to initiate the period of changed energization of another of said relays, thereby causing sequential operation of said switch means, each for an independently predetermined time.

10. Electrical timing apparatus, comprising in combination, a plurality of electrical control devices, each said device including an impedance and means operative to produce a control effect in response to the flow of current through said impedance, means associated with each impedance for maintaining a predetermined normal current flow therethrough, means for changing the current flow through each impedance for a predetermined period of time, said last-named means comprising, for each impedance, an electrical discharge device, an electrical network for controlling the conductivity of said device, and means for varying the time constant of said network to vary said predetermined time, and transfer means effective upon the termination of a period of changed current flow through each impedance to initiate a period of changed current flow through another of said impedances, thereby causing sequential operation of said current responsive means, each for an independently predetermined time.

11. Electrical timing apparatus, comprising in combination, a plurality of electrical control devices, each said device including an impedance and means operative to produce a control effect in response to the flow of current through said impedance, means associated with each impedance for maintaining a predetermined normal current flow therethrough, means for changing the current flow through each impedance for a predetermined period of time, said last-named means comprising, for each impedance, an electrical discharge device, an electrical network for controlling the conductivity of said device, and means for varying the time constant of said network to vary said predetermined time, and transfer means effective upon the termination of a period of changed current flow through each impedance to initiate a period of changed current flow through another of said impedances, thereby causing sequential operation of said current responsive means, each for an independently predetermined time, said transfer means including means operable upon the termination of the period of changed current flow through the last of said impedances to initiate another period of changed current flow through the first of said impedances, thereby causing said sequential operation of said current responsive means to be cyclically repeated.

12. Electrical timing apparatus, comprising in combination, a plurality of relay means, each said relay means comprising an electrical winding and switch means operated to a first position when said winding is energized and to a second position when said winding is deenergized, a pair of power supply terminals adapted for connection to a source of electrical energy, means for controlling the energization of each said winding comprising, for each winding, an electrical discharge device having an anode, a cathode, and a control electrode, means connecting said cathode and said control electrode including a resistance, means connecting said cathode, said anode, and said winding in series to said power supply terminals, a condenser, and a transfer switch for selectively connecting said condenser in a charging circuit wherein said condenser is across said winding, and in a discharging circuit wherein said condenser is across said resistance, said switch means in each relay means including said transfer switch for one of the other of said relay means, so that upon deenergization of any one winding, the condenser associated with a second winding is charged, and upon the subsequent energization of said one winding, the condenser associated with said second winding is discharged, causing deenergization of said second winding.

13. Electrical timing apparatus, comprising in combination, a plurality of electrical control devices, each said device including an impedance and means operative to produce a control effect in response to the flow of current through said impedance, means associated with each impedance for maintaining a predetermined normal current flow therethrough, means for changing the current flow through each impedance for a predetermined period of time, said last-named means comprising, for each impedance, an electrical discharge device, an electrical network for controlling the conductivity of said device, and means for varying the time constant of said network to vary said predetermined time, and transfer means effective upon the termination of a period of changed current flow through each impedance to initiate a period of changed current flow through another of said impedances, thereby causing sequential operation of said current responsive means, each for an independently predetermined time, said transfer means including means operable upon the termination of the period of changed current flow through the last of said impedances to initiate another period of changed current flow through the first of said impedances, thereby causing said sequential operation of said current responsive means to be cyclically repeated, and means for selectively rendering said last-named means effective or ineffective.

14. Electrical timing apparatus, comprising in combination, a plurality of relay means, each said relay means comprising an electrical winding and switch means operated to a first position when said winding is energized and to a second position when said winding is deenergized, a pair of power supply terminals adapted for connection to a source of continuous electrical energy, means for controlling the energization of each said winding comprising, for each winding, an electrical discharge device having an anode, a cathode and a control electrode, said discharge device having a characteristic such that said control electrode may prevent the initiation of a discharge, but may not control an existing discharge, a series connection including said cathode, said anode, said winding and said power supply terminals, and means for causing sequential operation of said relays comprising means operated as an incident to movement of the switch means associated with each one of said relays between said positions to temporarily open the series connection of the winding of another of said relays, means operated upon movement of said switch means associated with said one relay to said first position to apply a discharge-preventing potential to the control electrode of the discharge device associated with said other relay, and means for terminating the application of said discharge-preventing potential after a predetermined time.

15. Electrical timing apparatus, comprising in combination, a pair of power supply terminals adapted for connection to a source of electrical energy, an electrical discharge device having an anode, a cathode and a control electrode, said discharge device having a characteristic such that said control electrode may prevent the initiation of a discharge, but may not control an existing discharge, a series connection including said cathode, said anode, and said power supply terminals, a condenser, and means for controlling the conductivity of said device including a pair of simultaneously operable switches, one of said switches being selectively operable to connect said condenser in a charging circuit or in a discharging circuit wherein its negative terminal is connected to said control electrode, and the other of said switches being effective to momentarily interrupt said series connection upon operation thereof.

16. Timing apparatus for a camera having a shutter operator biased to a first position wherein said shutter is closed and movable to a second position wherein said shutter is open, comprising in combination, electrical motor means for driving said operator between said first and second positions, a pair of relay means, means for controlling the energization of said relay means including timer means associated with each relay means to cause deenergization thereof for a predetermined time, means effective upon expiration of a period of deenergization of one of said relays to initiate a period of deenergization of the other of said relays, and means operated upon deenergization of said other relay to cause energization of said motor means.

17. Timing apparatus for a camera having a shutter operator biased to a first position and movable to a second position and effective upon one movement thereof between said first and second positions to open said shutter and upon the next movement thereof between said first and second positions to close said shutter, comprising in combination, electrical motor means for driving said operator between said first and second positions, a pair of relay means, means for controlling the energization of said relay means including timer means associated with each relay means to cause deenergization thereof for a predetermined time, means effective upon expiration of a period of deenergization of one of said relays to initiate a period of deenergization of the other of said relays, and means operated upon energization of each of said relays to cause energization of said motor means sufficient to drive said operator from said first position to said second position.

18. Timing apparatus for a camera having a shutter, comprising in combination, motor means for moving said shutter between open and closed positions, a pair of relay means, means for controlling the energization of said relay means including timer means associated with each relay means to cause deenergization thereof for a predetermined time, means effective upon deenergization of one of said relay means to cause said motor means to open said shutter, and means effective upon deenergization of the other of said relay means to cause said motor means to close said shutter.

19. Timing apparatus for a camera having a shutter, comprising in combination, motor means for moving said shutter between open and closed positions, a pair of relay means, means for controlling the energization of said relay means including timer means associated with each relay means to cause deenergization thereof for a predetermined time, means effective upon deenergization of one of said relay means to cause said motor means to open said shutter, means effective upon deenergization of the other of said relay means to cause said motor means to close said shutter and means effective upon energization of either relay means to initiate a period of deenergization of the other relay means so that said shutter is opened and closed in repeated cycles.

20. Timing apparatus for a camera having a shutter, comprising in combination, motor means for moving said shutter between open and closed positions, a pair of relay means, means for controlling the energization of said relay means including timer means associated with each relay means to cause deenergization thereof for a predetermined time, means effective upon deenergization of one of said relay means to cause said motor means to open said shutter, means effective upon deenergization of the other of said relay means to cause said motor means to close said shutter, means effective upon energization of either relay means to initiate a period of deenergization of the other relay means so that said shutter is opened and closed in repeated cycles, means associated with each said timer means for varying the operation time thereof and hence the duration of the opening and closure of said shutter, and further means associated with both said timer means for simultaneously and oppositely varying the operation time thereof and hence changing the proportion of a complete cycle during which said shutter is open, without changing the length of the complete cycle.

21. Apparatus for timing the operation of the shutter of an aerial camera to produce stereoscopic aerial survey pictures, comprising in combination, motor means for opening and closing said shutter, a pair of relay means, means for controlling the energization of said relay means including timer means associated with each said relay means to cause deenergization thereof for a predetermined time, means effective upon deenergization of either of said relay means to cause said motor means to open and close said shutter, thereby causing an exposure of film, means effective upon energization of either relay means to initiate a period of deenergization of the other relay means so that said shutter is opened and closed in repeated cycles, and means associated with each said timer means for varying the operation time thereof and hence the duration of the periods of closure of said shutter, one of said time varying means being effective to determine the interval between the exposures producing one pair of stereoscopic pictures, and the other time varying means being effective to determine the interval between successive pairs of exposures.

22. Apparatus for timing the operation of the shutter of an aerial camera to produce stereoscopic aerial survey pictures, comprising in combination, motor means for opening and closing said shutter, a pair of relay means, means for controlling the energization of said relay means including timer means associated with each said relay means to cause deenergization thereof for a predetermined time, means effective upon deenergization of either of said relay means to cause said motor means to open and close said shutter, thereby causing an exposure of film, means effective upon energization of either relay means to initiate a period of deenergization of the other relay means so that said shutter is opened and closed in repeated cycles, means associated with each said timer means for varying the operation time thereof and hence the duration of periods of closure of said shutter, one of said time varying means being effective to determine the interval between exposures producing one pair of stereoscopic pictures and the other time varying means being effective to determine the interval between sequential pairs of exposures, and altitude responsive means for simultaneously operating both said time varying means so as to provide constant overlap of successive pictures even though the altitude of the camera changes between said successive pictures.

23. Electrical timing apparatus, comprising in combination, a plurality of electrical control devices, each said device including an impedance and means operative to produce a control effect in response to the flow of current through said impedance, means associated with each impedance for maintaining a predetermined normal current flow therethrough, means for changing the current flow through each impedance for a predetermined period of time, said last-named means comprising, for each impedance, an electrical discharge device, an electrical network for controlling the conductivity of said device, and means for varying the time constant of said network to vary said predetermined time, transfer means effective upon the termination of a period of changed current flow through one of said impedances to initiate a period of changed current flow through another of said impedances, thereby causing a cycle of operation of said current responsive means, said cycle comprising a first period in which one of said current responsive means is energized and a second period in which the other of said current responsive means is energized, and means including a single controller for simultaneously operating at least a portion of both said time constant varying means in opposite senses so as to change the ratio between said first and second periods without changing the length of said cycle.

24. Electrical timing apparatus, comprising in combination, a plurality of electrical control devices, each said device including an impedance and means operative to produce a control effect in response to the flow of current through said impedance, means associated with each impedance for maintaining a predetermined normal current flow therethrough, means for changing the current flow through each impedance for a predetermined period of time, said last-named means comprising, for each impedance, an electrical discharge device, an electrical network for controlling the conductivity of said device, and means for varying the time constant of said network to vary said predetermined time, transfer means effective upon the termination of a period of changed current flow through one of said impedances to initiate a period of changed current flow through another of said impedances, thereby causing a cycle of operation of said current responsive means, said cycle comprising a first period in which one of said current responsive means is energized and a second period in which the other of said current responsive means is energized, and means including a single controller for simultaneously operating at least a portion of both said time constant varying means in the same sense, so as to change the length of said cycle without changing the ratio between said first and second periods.

25. Electrical timing apparatus, comprising in combination, a plurality of electrical control devices, each said device including an impedance and means operative to produce a control effect in response to the flow of current through said impedance, means associated with each impedance for maintaining a predetermined normal current flow therethrough, means for changing the current flow through each impedance for a predetermined period of time, said last-named means comprising, for each impedance, an electrical discharge device, an electrical network for controlling the conductivity of said device, and means for varying the time constant of said network to vary said predetermined time, transfer means effective upon the termination of a period of changed current flow through one of said impedances to initiate a period of changed current flow through another of said impedances, thereby causing a cycle of operation of said current responsive means, said cycle comprising a first period in which one of said current responsive means is energized and a second period in which the other of said current responsive means is energized, means including a first controller for simultaneously operating first portions of both said time constant varying means in opposite senses so as to change the ratio between said first and second periods, and means including a second controller for simultaneously operating second portions of both said time constant varying means in the same sense so as to change the length of said cycle.

26. Electrical timing apparatus, comprising in combination, a pair of power supply terminals adapted for connection to a source of electrical energy, an electrical discharge device having an anode, a cathode and a control electrode, said discharge device having a characteristic such that said control electrode may prevent the initiation of a discharge, but may not control an existing discharge, a series connection including said cathode, said anode, and said power supply terminals, a condenser, and means for controlling the conductivity of said device including a pair of simultaneously operable switches, one of said switches being selectively operable to connect said condenser in a charging circuit or in a discharging circuit wherein its negative terminal is connected to said control electrode, and the other of said switches being effective to momentarily interrupt said series connection upon operation thereof, said switches being so related that said discharging circuit is completed by said first switch during the interruption of said series connection by said other switch.

ALWIN B. NEWTON.